United States Patent [19]

Teshima et al

[11] Patent Number: 4,889,408

[45] Date of Patent: Dec. 26, 1989

[54] PLASTIC OPTICAL FIBER LESS ATTENUATING LIGHT AND PROCESS FOR PRODUCING THE SAME

[75] Inventor: Shinichi Teshima, Yokohama, Tadashi Yamaga, Kawasaki, both of Japan

[73] Assignee: Asahi Kasei Kogyo Kabushiki Kaisha, Osaka, Japan

[21] Appl. No.: 926,516

[22] Filed: Nov. 4, 1986

[51] Int. Cl.[4] .......................... B32B 27/00; G02B 6/00

[52] U.S. Cl. .................................. 350/96.34; 428/373; 428/394

[58] Field of Search ........................ 428/373, 375, 394; 350/96.34, 96.30; 526/245

[56] References Cited

U.S. PATENT DOCUMENTS 3,950,315 4/1976 Cleaver ................................ 526/245
3,993,834 11/1976 Chimura et al. ............. 350/96.34 X
4,318,269 4/1983 Kaino et al. ......................... 428/373
4,544,235 10/1985 Nishida et al. .................... 350/96.34

FOREIGN PATENT DOCUMENTS 57-104906 6/1982 Japan .
58-193502 11/1983 Japan .
59-152909 8/1984 Japan .................................. 526/245
61-66706 4/1986 Japan .

*Primary Examiner*—Lorraine T. Kendell
*Attorney, Agent, or Firm*—Birch, Stewart, Kolasch & Birch

[57] ABSTRACT

A plastic optical fiber comprising a polymer core constituted mainly of methyl methacrylate and a polymer cladding having a lower refractive index than that of the core, characterized in that the core consists of a methyl methacrylate homopolymer or a copolymer constituted of at least 95% by weight of methyl methacrylate and less than 5% by weight of (i) methyl acrylate, (ii) ethyl acrylate, or (iii) a mixture of both acrylates, that the weight-average molecular weight of the core polymer is from 80,000 to 200,000, and that light attenuations through the fiber are up to 250, 130, 80, and 130 dB/Km at wavelengths of 400, 450, 570, and 650 nm, respectively, and a process for producing the same.

3 Claims, 1 Drawing Sheet

PLASTIC OPTICAL FIBER LESS ATTENUATING LIGHT AND PROCESS FOR PRODUCING THE SAME

BACKGROUND OF THE INVENTION

1. Field of the Invention

The present invention relates to a plastic optical fiber having a polymer core constituted mainly of methyl methacrylate. Particularly, the invention is directed to a plastic optical fiber having high efficiency of guiding visible rays of 400 to 650 nm wavelengths and excellent performance of transmitting signals or optical energy.

2. Description of the Prior Art

For the purpose of producing a plastic optical fiber having high efficiency of light transmission, the primary object is to produce a core polymer having a high transparency. U.S. Pat. No. 4,161,500 discloses a process for spinning fiber which comprises the fractional distillation of a monomer in a sealed system, charging the refinded monomer through a filter having a pore size of 0.2 to 1 μm into a cylindrical polymerization vessel having an inner diameter of 25 to 30 mm, sealing the vessel, completing the polymerization under specific pressure and temperature conditions, cooling and withdrawing the resulting solid preform, feeding it into the barrel of a ram extruder, and co-extruding the fed polymer as a core material together with a cladding material. It is reported that light attenuation through the thus produced plastic optical fiber was 274 dB/Km at 656 nm.

U.S. Pat. No. 4,381,269 proposes a polymerization process in a sealed system which comprises charging a monomer, polymerization initiator, and chain transfer agent through a distillation step into a polymerization vessel, bulk polymerizing the monomer to form a core polymer, and melt-spinning the obtained core polymer. In this process, the monomer is mixed with 0.1 mol % of an azo bis-t-butane polymerization initiator and 0.3 mol % of an n-butyl mercaptan chain transfer agent, is completely polymerized and the resulting polymer is extruded through a cock at the bottom to produce a plastic optical fiber. It is reported that light attenuations through this optical fiber are 90, 88, and 178 dB/Km at wavelengths of 523, 568, and 650 nm, respectively. In another example of this patent, a fiber is produced by similarly polymerizing a methyl methacrylate monomer using azo bis-t-butane and n-butyl mercaptan, heating the completely polymerized product to 200° C., and extruding the polymer from the polymerization vessel by applying pressure with nitrogen gas. Light attenuations through the obtained optical fiber are confirmed to be 62, 58, and 130 dB/Km at wavelengths of 516, 566, and 648 nm, respectively. This patented invention is acceptable to the extent that it is the first to disclose that an attenuation of 100 dB/Km can be achieved with a plastic optical fiber, but the production process disclosed for producing this fiber involves problems when utilized for the manufacturer of plastic optical fibers which are utilizable in industrial applications.

In contrast to these processes for producing plastic optical fibers in sealed systems, U.S. Pat. No. 3,993,834 proposes a continuous bulk polymerization process for producing a core polymer, in which a reaction mixture of a monomer and—is continuously fed into a polymerization vessel, thoroughly stirred and kept at a temperature of above 130° C. and below 160° C. while maintaining polymer content Φ in said reaction mixture substantially constant, so as to satisfy the following relationship:

$$50<\Phi<\exp(0.0121T-1.81)$$

wherein T represents the polymerization temperature in Calsius. Using the thus produced core polymer, a plastic optical fiber is fabricated.

Japanese patent application Laid-Open No. 104906/82 to proposes a process for producing a core polymer according to the continuous bulk polymerization technique of U.S. Pat. No. 3,993,834, except that the monomer, before being fed into a polymerization vessel, is filtered through a porous film. According to an example disclosed in this patent application, a light attenuation of 92 dB/Km at a wavelength of 577 nm is confirmed. Moreover, Japanese patent application Laid-Open No. 193502/83 proposes a continuous process for producing a plastic optical fiber which comprises successive removal of dissolved oxygen, monomer peroxide, and fine particles from a monomer, followed by continuous bulk polymerization of the purified monomer.

All the above stated prior techniques have been proposed to obtain high-performance plastic optical fibers, but none of these techniques produces plastic optical fiber which are satisfactory for practical use because each of these techniques are connected with the following various unsolved problems. For example, processes for producing plastic optical fibers in sealed systems, as proposed in U.S. Pat. Nos. 4,161,500 and 4,381,269, permit a high-degree purification of feedstock, but have the drawback in that when these processes are utilized, it is extremely difficult to clean the inner walls of the purification facilities and of the polymerization vessel to the same level as the level of the purified raw material. The cleaning of these systems is similarly or more important and more difficult than the cleaning of the raw materials. Since the stability of product quality and the economy of production are of extreme importance to an industrial production process, the cleaning of facilities becomes an issue in the case of the sealed systems wherein polymerization initiation is repeated each time and this is undesirable.

On the other hand, the continuous system is favorable for industrial production. However, when a monomer in the liquid state is filtered through separator films having pore sizes of 500 to 2000 Å as described in Japanese patent application Laid-Open No. 104906/82, fine particles which remain in the monomer would have a significant effect so that a high-performance plastic optical fiber cannot be obtained. When a monomer in the vapor state is filtered, pores the of the filter tend to be clogged with polymeric matter so that a stable operation cannot be continued for long period of time. When methyl methacrylate or a monomer mixture composed mainly thereof is filtered through such ultrafilters with pore sizes of scores of angstroms capable of filtering off human albumin in a separation efficiency of at least 90% as described in Japanese patent application Laid-Open No. 193502/83 (filed by the present inventors), the polymer that formed therefrom increases with time passage and is caught by the filters, which gradually leads to their pores being clogged so that long-term continuous stable operation of such equipment is impossible. Further, in order to distill a monomer (methyl methacrylate or a monomer mixture composed mainly of it) in the absence of oxygen as described in Japanese patent application Laid-Open No. 193502/83, the monomer peroxide contaminating the monomer should be completely decomposed in advance by heat-treatment. Otherwise the distillate monomer will readily polymerize. In any case, difficulties in long-term operation are connected with the processes described above.

SUMMARY OF THE INVENTION

An object of the invention is to provide a plastic optical fiber having a polymer core constituted mainly of methyl methacrylate, through which light attenuation will be minimized over a visible ray region as wide as from 400 to 650 nm.

Another object of the present invention is to provide a process for producing such a plastic optical fiber.

To achieve the above objects, the present inventors have made intensive studies, and as a result, have found that the process described in detail hereinafter gives an unprecedently and unexpectedly high-performance plastic optical fiber, in particular through which light attenuation is very slight over a wide range of wavelengths. Based on this finding, the present invention has been accomplished.

According to an embodiment of the present invention, there is provided a plastic optical fiber comprising a core polymer constituted mainly of methyl methacrylate and a clad polymer having a lower refractive index than that of the core, characterized in that the core consists of a methyl methacrylate homopolymer or a copolymer constituted of at least 95% by weight of methyl methacrylate and less than 5% by weight of (i) methyl acrylate, (ii) ethyl acrylate, or (iii) a mixture of both acrylates, that the weight-average molecular weight of the core polymer is from 80,000 to 200,000, and that light attenuations through the fiber are up to 250, 130, 80, and 130 dB/Km at wavelengths of 400, 450, 570, and 650 nm, respectively.

According to another embodiment of the present invention, there is provided a process for producing a core-cladding structure, which comprises;

(A) the steps of distilling a monomer in the presence of oxygen, removing dissolved oxygen from the distillate, and continuously charging the purified monomer into a polymerization vessel, and (B) on the other hand, the steps of diluting each of a chain transfer agent and a polymerization initiator or their mixture with a purified solvent, either (i) filtering the solution through an ultrafilter constructed of hollow fibers having dense walls with a pore size of 100 Å or less, and removing dissolved oxygen from the filtrate, or (ii) removing said oxygen and then filtering the resultant, and continuously charging the purified filtrate into the polymerization vessel, (C) followed by the steps of continuous solution polymerization of the charged monomer, removing volatile matter from the polymerization product in a degasifier, forming a core fiber from the polymer product, and cladding the core fiber with a polymer having a lower refractive index than that of the core polymer.

DETAILED DESCRIPTION OF THE PREFERRED EMBODIMENT

Figure 1:
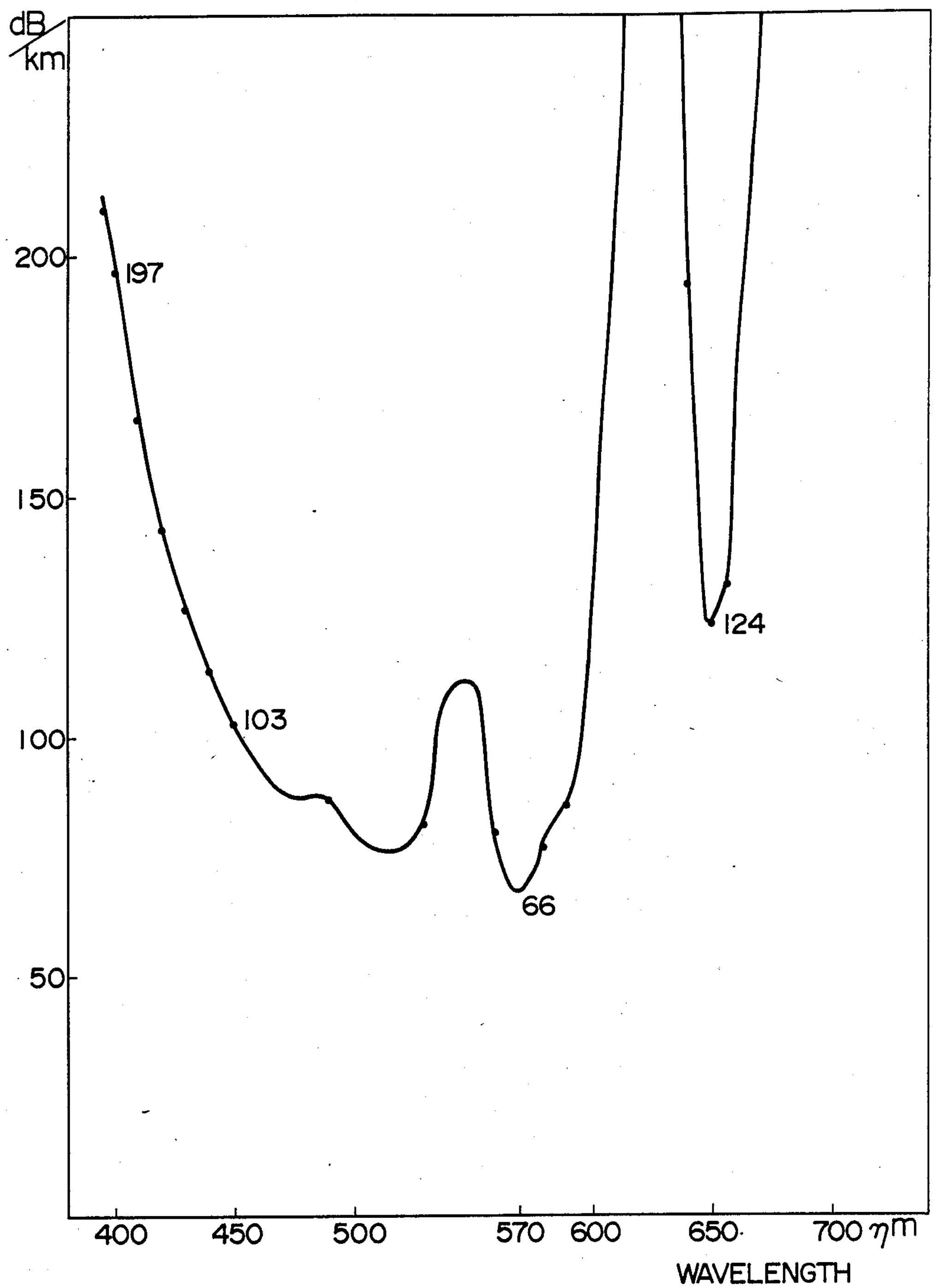
FIG. 1 shows a typical spectrum of light attenuation through the optical fiber obtained in Example 1 of the present invention.

The core polymer constructing the high-performance plastic optical fiber of the present invention consists of a methyl methacrylate homopolymer or a copolymer constituted of at least 95% by weight of methyl methacrylate and less than 5% by weight of (i) methyl acrylate, (ii) ethyl acrylate, or (iii) a mixture of both acrylates. The limitation of the methyl methacrylate content to at least 95% by weight is for the purpose of securing a plastic optical fiber resistant to temperatures of up to at least 80° C. The molecular weight of core polymer is desirably from 80,000 to 200,000, preferably from 90,000 to 120,000. If the molecular weight is below 80,000, the mechanical strength will be unsatisfactory. If the molecular weight exceeds 200,000, smooth spinning of such a core polymer would be impossible. The content of volatile matter in the core polymer is desirably up to 1%, preferably up to 0.5%, by weight so as to ensure the reliability of the plastic optical fiber for long-term use. In addition, the plastic optical fiber fabricated by cladding the core polymer needs to exhibit attenuations of up to 250, 130, 80, and 130 dB/Km at wavelengths of 400, 450, 570, and 650 nm, respectively. The core polymer exhibiting such high performance has not been obtained up to the present time by a prior art method. It has for the first time been obtained by the present inventors. In order to obtain such a core polymer for a high-performance plastic optical fiber; mere simple high-degree purification of the raw materials is not sufficient. It has been discovered that a process must be established and employed in which the resulting polymer is produced from purified raw materials which will not undergo any new contamination. One new contamination source is derived from the low degree of cleaning of the whole production system for raw material purification, raw material feeding, polymerization, and spinning, which the materials must pass through. It has been ascertained that several days are required for a complete purging of the fine particles which are adhered to the whole inner wall of the production system. For this purpose, it is important to operate the production process steadily over a long term, and the amelioration of raw material purification steps in particular has been investigated. Although preferable, the high degree purification of raw materials is not acceptable if it is excessive and complicated and does not permit a long-term stable operation. The present invention has optimized both the degree of raw material purification and the stability of operation.

The monomer purification method adopted in the present invention comprises a distillation of the monomer in the present of oxygen to remove fine particles, followed by an immediate elimination of the dissolved oxygen from the distillate monomer. The distillation in the presence of oxygen, as compared with a distillation in the absence of oxygen, results in the introduction of an extremely minute amount of oxygen and monomer peroxide in the monomer but avoids problems, i.e. polymerization occurring during the distillation step. The amount of oxygen in the distillation step is required to be of such an order so as to dissolve at least 50 ppm, preferably from 100 to 5000 ppm of the monomer liquid, in excess of the previously dissolved oxygen present in the monomer liquid that consists mainly of methyl methacrylate. The newly supplied oxygen may be in the form of air, plain oxygen gas, or oxygen diluted with an inert gas. For the purpose of preventing the coloration due to the methyl methacrylate monomer peroxide, it is desirable that the distillation be conducted at a low temperature under reduced pressure and that the distillate be cooled to a low temperature, so that the formation of monomer peroxide from the monomer and oxygen would be inhibited to the extent possible. Dissolved oxygen is required to be removed immediately from the monomer liquid obtained by distillation, without withdrawing the monomer from the system. This is due to methyl methacrylate peroxide resulting from the contact of the monomer with oxygen. The presence of this peroxide in the monomer, similarily to the presence of oxygen, is responsible for the coloration of the polymer. A most effective method for this removal is to immediately feed the distillate monomer into a stripping column without stagnation, and bring the fed distillate monomer into contact with a countercurrently blowing inert gas such as nitrogen gas, thereby quickly removing dissolved oxygen. After this oxygen removal step, the material is kept at a temperature of up to 15° C., preferably up to 10° C. The efficiency of dissolved oxygen removal from the monomer is determined by using a dissolved oxygen analyzer comprising a polyarographic type sensor for nonaqueous solvent purposes. This measurement is conducted as follows: Methyl methacrylate is exposed to the atmosphere at 10° C. for a sufficient time; the thus equilibrated methyl methacrylate is used as a calibration liquid; the amount of dissolved oxygen therein is measured by taking the reading on the analyzer; then the amount of dissolved oxygen in a sample monomer, which had been subjected to the oxygen removal treatment, is measured at 10° C. by taking the reading on the analyzer. The ratio (%) of the latter reading to the former is calculated as the percentage of the remaining dissolved oxygen. Since plastic optical fibers prepared by using monomers of high percentages of remaining dissolved oxygen give large attenuations in the wavelength region of from 400 to 450 nm, the percentage of remaining dissolved oxygen should be controlled to 3% or less, preferably 1% or less. The inert gas used for countercurrent contact with the distilled monomer in the stripping column must be previously filtered, of course, through an ultrafilter or the like. To minimize the content of impurity oxygen in the inert gas, it is desirable to use a commercially available high purity nitrogen gas of 0.1 ppm oxygen concentration or a similar gas purified through a column to adsorb traces of oxygen. By such a treatment, dissolved oxygen can be removed sufficiently without any contamination of the monomer. In the above monomer purification, no problem arises when the monomer to be treated is methyl methacrylate along or a mixture thereof with methyl acrylate or with ethyl acrylate. The purified monomer is then continuously into pumped a polymerization vessel.

In the next place, a polymerization initiator and a chain transfer agent are purified and charged in the following manner: These materials are dissolved separately or together in a purified solvent. After the continuous removal of fine particles and dissolved oxygen, these solutions are continuously charged into the polymerization vessel.

The polymerization initiator and the chain transfer agent may be treated separately or in combination. Fine particles in the solution(s) of both materials need to be removed by using ultrafilters capable of removing fine particles having sizes of 100 Å or more. As an example, U.S. Pat. No. 3,871,950 describes such ultrafilters, which are constructed of a dense layer having pore sizes of 100 Å or less. Desirably, ultrafilter films used herein are made of polyacrylonitrile in view of the corrosion resistance thereof to the solvent, the polymerization initiator, and the chain transfer agent (a mercaptan). Ultrafilters formed of hollow polyacrylonitrile fibers are particularly suitable from the viewpoint of the fineness of removable particles in which these fibers are capable of removing and the corrosion resistance to the polymerization initiator, the chain transfer agent, and the solvent. Separation filters favorable in filtration capability are available which are capable of separating human albumin (molecular weight 50,000) in 90% or more efficiency (e.g. hollow polyacrylonitrile fiber HH-1, supplied by Asahi Chemical Industriesl Co., Ltd.). More desirable separation filters are capable of separating cytochrome C (molecular weight 13,000) in 90% or more efficiency (e.g. hollow polyacrylonitrile fiber HC-5, supplied by Asahi Chemical Industries Co., Ltd.). The efficiency of separating human albumin or cytochrome C is defined herein as follows: Human albumin or cytochrome C is dissolved in physiological saline solution (buffered to pH 7 with a 0.15 mol/l phosphate solution) to a concentration ($C_1$) of 0.025% by weight. The solution is passed in a hollow fiber for ultrafiltration at a velocity of 1 m/sec. Then, the concentration ($C_2$) of human albumin or cytochrome C in the outflow is determined by measuring the ultraviolet absorbance at 280 nm. The thus determined value $[(C_1-C_2)\times 100/C_1]$ is defined as the separation efficiency.

It should be noted that common ultrafilter modules commercially available cannot be used as such, since these modules, for fixing hollow fibers, comprise adhesives and housing materials which are readily attacked by the monomer, the polymerization initiator, and the chain transfer agent.

For the purpose of fixing hollow polyacrylonitrile fibers, it is advisable to insert stainless steel tubes having an outer diameter slightly larger than the inner diameter of the hollow fiber into the hollow fiber. The housing may be constructed of stainless steel or some other corrosion-resistant material.

The solvent used herein is charged along with the polymerization initiator and the chain transfer agent into the polymerization vessel. Hence, it is necessary to choose, as the solvent, a liquid having no adverse effect on the quality of the resulting polymer. Such suitable liquids include ethylbenzene, methyl isobutyrate, and toluene which have been treated with activated alumina. In particular, ethylbenzene when used gives high-performance plastic optical fibers. Other effects of the use of a solvent are that minute mounts of the polymerization initiator and chain transfer agent can be more quantitatively supplied by dilution with the solvent and hence the resulting polymer has definite quality and that the presence of the solvent in the polymerization system prevents local high concentration of solids in the system. The solvent is not satisfactorily purified by distillation alone; adsorption treatment with activated alumina is necessary. A more favorable method for solvent purification is to combine activated alumina treatment with distillation. To the polymerization initiator and chain transfer agent diluted with such solvents, ultrafilters comprising hollow polyacrylonitrile fibers withstand as long as 90 days or more.

Dissolved oxygen in solutions of the polymerization initiator and of the chain transfer agent is removed in the same manner as for the oxygen removal from the monomer. The step of oxygen removal and the step of fine particle removal on an ultrafilter may be operated in reverse order. The polymerization initiator and the chain transfer agent are added an amount sufficient to make the concentration of the solvent to the monomers desirably 5 to 30% by weight. While a large amount of solvent is used for the production of a core polymer of specially high molecular weight, too large amounts of solvent are not advisable since the amount of fine particles increases as the amount of solvent is increased. Thus the polymerization initiator and the chain transfer agent in the form of solution are free of fine particles and oxygen, are ready to be charged into the polymerization vessel.

The polymerization can be continuously carried out completely in a mixing single-stage type reaction system, or a multistage reaction system, or completely in a mixing vessel and plug flow type reactor combined system, or a plug flow type of reaction system. The polymer content in the reaction mixture relates to the contamination (degradation) caused by the stagnation in dead spaces in the equipment during passage of the reaction mixture from the polymerization vessel to a degasifying stage. When the polymer content is high, the temperature of the pipe for passing the polymerization product mixture is required to be increased and this tends to develop colored matter. Therefore it is desirable not to much raise the polymer content in any large extent. Particularly preferred polymer contents are from 30 to 60% by weight.

Desirable polymerization initiators are azoalkane catalyst such as azobisoctane represented by the formula

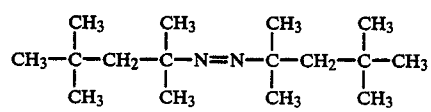

and azo bis-t-butane represented by

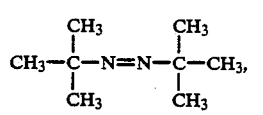

the former being preferable. The use of azonitrile compounds and peroxides result in core polymers which give large light attenuations at wavelengths of up to 450 nm. The polymerization initiator, for example an azoalkane catalyst, when added in a large amount, results in large attenuations at wavelengths of up to 450 nm and hence is required to be added in an amount of up to 0.01 mol %, preferably up to 0.005 mol %, based on the monomer. From this viewpoint, it is undesirable that the polymerization initiator be added in large amounts for the purpose of raising the polymerization yield. Specially, in the method of completing polymerization in a sealed system, the amount of polymerization initiator is too large for achieving small attenuations at wavelengths of 400 to 450 nm. This is in contrast with the present continuous polymerization method, in which the amount of polymerization initiator can be decreased.

Suitable chain transfer agents for use herein include n-butyl mercaptan, t-butyl mercaptan, n-propyl mercaptan, and n-octyl mercaptan. The amount of chain transfer agent added governs the molecular weight of the resulting core polymer. Favorable molecular weights of the core polymer are from 80,000 to 200,000, particularly from 90,000 to 120,000, in terms of weight-average molecular weight as measured by gel permeation chromatography (GPC). When the molecular weight is less than 80,000, the mechanical strength of the polymer is unsatisfactory. The molecular weight exceeding 200,000 makes it difficult to spin the polymer smoothly. The molecular weight depends chiefly on the type and amount of chain transfer agent though influenced also by the type and amount of solvent used in the polymerization. When the amount of solvent is large, a polymer of the intended molecular weight can be obtained with a somewhat less amount of chain transfer agent. When an alkyl mercaptan as cited above is used in amounts of about 0.22 to 0.07 mol %, the weight-average molecular weight becomes from 80,000 to 200,000. The molecular weight measured by GPC is the value based on a calibration chart made from an elution curve which has been obtained by using standard monodisperse polystyrenes of known different molecular weights and tetrahydrofuran as solvent.

The core polymer of the present invention may be a methyl methacrylate homopolymer or a copolymer constituted of 95% by weight of methyl methacrylate and either methyl acrylate or ethyl acrylate. This limitation of the methyl methacrylate content to at least 95% by weight is for the purpose of securing a plastic optical fiber resistant to temperatures of up to 80° C. at least. The polymerization product mixture composed of the polymer, unreacted monomer, solvent, and polymerization initiator, in the continuous-polymerization vessel, is then fed into a degasifier, wherein volatile matter is expelled from the mixture. Suitable degasifiers for use herein include a vent-type extruder, a flush tank in which the heated product mixture is fed through a slit to flow down and meantime volatile matter is expelled from the mixture, or an arrangement combining such a flush tank with a vent-type extruder. The volatile matter content in the core polymer should be decreased to 1% or less, preferably 0.5% or less, to ensure the reliability of the plastic optical fiber for long-term use. The core polymer free from volatile matter is then fed into a composite-spinning die, and spun along with a cladding polymer fed from another extruder, thereby fabricating a plastic optical fiber of core-cladding structure.

For the high-performance plastic optical fiber of the present invention, the core polymer is specially important while the cladding polymer also plays an important role. A property necessary for the cladding polymer is a sufficiently lower refractive index than that of the core polymer. The refractive index ($n_D^{20}$) of cladding polymer is desirably up to 1.43, preferably up to 1.415. As the refractive index lowers, the maximum possible light incident angle increases. Additional properties necessary for the cladding polymer are high transparency, mechanical strength, heat resistance, and adhesiveness to the core. At present, however, no perfect cladding polymer is found and polymer well-balanced, as a whole, in properties are chosen as cladding materials.

In the process of the present invention, the polymer used for the cladding to provide superior attenuation characteristics can be selected from the group comprising;

(1) copolymers of at least one of the following group (A) monomers and at least one of the following group (B) monomers;

(A) group monomers: $CH_2{=}C{\cdot}CH_3COOCH_2(CF_2)_mH$, wherein m is 1 or 2, (B) group monomers: $CH_2{=}{\cdot}CH_3COOCH_2(CF_2)_nF$, wherein n is 1 or 2, (2) copolymers of at least one of the group (A) monomers, at least one of the group (B) monomers, and methyl methacrylate, and (3) copolymers of at least one of the groups (A) and (B) monomers and methyl methacrylate.

However, it is desirable to use such a copolymer as defined below, for the purpose of producing a plastic optical fiber having not only super anti-attenuation characteristics but also high mechanical strength, heat resistance, and long-term stability under harsh environmental conditions. That is a copolymer which comprises (a) 40 to 80% by weight of 2-(perfluorooctyl)ethylmethacrylate represented by the formula $$CH_2{=}C{\cdot}CH_3{\cdot}COO(CH_2)_2(CF_2)_7CF_3 \quad (I),$$

(b) 15 to 50% by weight of at least one monomer selected from the group consisting of short-chain fluoroalkyl methacrylates represented by the formula $$CH_2{=}C{\cdot}CH_3COOCH_2(CF_2)_nX \quad (II),$$

wherein n is an integer of 1 to 4, and (c) 0 to 20% by weight of methyl methacrylate, said copolymer exhibiting a melt flow index of 10–200 g/10 min as measured under the conditions (230° C., 3.8 Kg load, orifice diameter 2.0955 mm) defined in ASTM D-1238, a refractive index ($n_D^{20}$) of 1.39 to 1.42, and a Vicat softening temperature (ASTM D1525-76) of 50° to 85° C., preferably 60° to 85° C. Preferably, this type copolymer has at least 5% by weight of difluoroethyl methacrylate or tetrafluoropropyl methacrylate as the short-chain fluoroalkyl methacrylate. These copolymers may further contain up to 1% by weight of a copolymerizable monomer, e.g. acrylic acid, acrylic ester, methacrylic acid, or methacrylic ester.

Care must be taken in measuring light attenuations through plastic optical fibers since the value varies with the measurement conditions. In the present invention, conditions of measuring spectra of attenuation through optical fibers with a spectrophotomer are as follows:

A monochromatic light beam whose half breadth is 2.5 nm from a monochrometer is converged to give a range of incident angles of 0.15 radian and a beam diameter of less than 0.2 mm at an end surface of the test optical fiber to enter the fiber. The spectrophotomer is provided with a chopper and a lock-in amplifier so as not to be affected by other incident rays. The element to detect the light leaving the fiber is an Si-PIN photodiode. Since the attenuation at 650 nm is affected by the degree of moisture absorption in the sample fiber, it is conditioned by drying in a hot-air over at 70° C. for 5 to 24 hours before measurement. The sample fiber is cut to a length of 52 m and both the ends are pressed against a hot plate to be mirror-finished. One end of the fiber is fixed on a minutely shiftable table positioned on the light source side and the other end of the fiber on a minutely shiftable table positioned on the light-detector side. The positions of the fiber ends are adjusted by manipulating the minutely shiftable tables to maximize the light energy transmitted by the fiber. After measurement of this transmitted light energy ($P_1$) in the wavelength range of 400 to 650 nm, the sample fiber is cut and removed but 2 m of one end portion thereof is left with the end fixed as such and the other end of the portion is fixed anew. This sample is similarly measured for the transmitted light energy ($P_2$) in the wavelength range of 400 to 650 nm. The attenuation is determined from the following equation:

$$dB/Km = 10 \times \log (P_2/P_1) \times (1000/(52\text{-}2))$$

The reproducibility of this measuring method is as good as the variation in the found value is ±1 dB/Km at a wavelength of 450 nm or longer and up to ±5 dB/Km at 400 nm. The spectrophotomer is previously calibrated for wavelengths by using standard light sources.

In the present invention, the attenuation is measured in principle on bared plastic optical fibers of core-cladding structure but also may be evaluated on cords fabricated by coating such bared fibers with polyethylene since the attenuation in this case is practically not altered.

The following examples illustrate the present invention.

EXAMPLE 1

A monomer mixture of 99.5 wt % of methyl methacrylate containing no polymerization inhibitor and 0.5 wt % of methyl acrylate is continuously fed at a rate of 3.5 Kg/hr into a still under operation at 100 torr. Continuous distillation is effected while blowing air at a rate of 5N 1/hr into the bottom and withdrawing bottoms at a rate of 0.1 Kg/hr. The obtained distillate is fed into the top of a stripping column of 2 m packing height and 40 mm inner diameter packed with 3 mm diameter glass beads. High purity nitrogen gas of 0.1 ppm oxygen concentration is filtered in two stages through ultrafilters (HC-5, supplied by Asahi Chem. Ind. Co., Ltd.) formed of 1.4 mm inner diameter hollow polyacrylonitrile fibers (separation efficiency: at least 90% for cytochrome C (M.W. 13,000, calculated particle size 30 Å or less)), and fed at a rate of 1N $m^3$/hr into the bottom of the stripping column. In a glass cell placed in the course of the monomer mixture effluent from the bottom, the mixture is irradiated with an He-Ne laser beam to check the presence of shining fine particles. Over 90 days' observation, there is not found shining particle in the path of the laser beam or enlargement of the laser beam width.

The amount of oxygen dissolved in the monomer is determined by using an oxygen analyzer model 2713 mfd. by Orbisphere Laboratories. A sensor attached to said analyzer is called as model 2110. For the determination of the oxygen amount dissolved in the monomer, however, among parts of said sensor, parts setting up by Delurin ® and Viton ® are replaced by those made of Teflon ® (a registered trademark of Du Pont) material due to their non-anticorrosive properties against the monomer.

The operation of the determination is conducted as mentioned below:

In order to remove the oxygen dissolved in electrolyzates of said sensor completely before the determination, said sensor is kept soaked in a saturated aqueous sulfurous acid for one hour with keeping the switch of said analyzer on until the reading of the meter indicated less than 1 ppb. After the confirming that, said sensor is placed in a closed chamber containing the air of atmospheric pressure whose relative humidity is adjusted to 100%. Thereafter, the interior temperature of the chamber is measured. The meter of said sensor is adjusted to indicate the reading corresponding to the amount of oxygen dissolved in water having the same temperature as that determined above. That is, if the temperature is 23° C., the meter indication should be adjusted to 8.55 ppm.

In this respect, it should be kept in mind that the amount of oxygen dissolved in the monomer is given only as a relative figure while that of oxygen dissolved in water is given as an absolute one. Therefore, in order to know to what extent the oxygen dissolved in the monomer is removed, a ratio of a reading for the amount of oxygen dissolved in the monomer after the removal to that of oxygen dissolved in the monomer under atmospheric pressure of the air was determined in the manner mentioned below:

After bubbling the air into methacrylate stored in a tank kept at 10° C. under atmospheric pressure so as to dissolve oxygen at the saturated concentration therein, the resulting methacrylate was supplied to the sensor of model 2110 of said analyzer at the rate of 3 1/hr. Usually, the reading of the meter is around 8.94 ($R_0$). Then, the monomer from which dissolved oxygen had been removed according to the present process is supplied at the same rate to the sensor. Usually, the reading of the meter is about 0.063 ($R_1$). That is, the ratio of the remaining oxygen in the monomer which has been subjected to the removal procedure of the present invention can be given by the equation:

$$R_1 \div R_0 \times 100,$$

and usually, the ratio is about 0.7% as given by $0.063 \div 8.94 \times 100 = 0.7\%$.

This monomer is fed at a rate of 3 Kg/hr into a polymerization vessel. On the other hand, azobisoctane, as a polymerization initiator, and n-butyl mercaptan, as a chain transfer agent, are each dissolved in ethylbenzene, which had been passed in advance through a glass column packed with an activated alumina (neutral, Grade I) supplied by Woelm Co. to remove impurities by adsorption. This alumina column on adsorption of impurities develops a yellow absorption band. Hence the column is exchanged with a fresh one before the yellow band would extend to the bottom of the column. Further, the ethyl benzene is distilled to remove fine particles. Concentrations of azobiscotane and n-butyl mercaptan in the ethylbenzene solutions are 0.072% and 2.935%, respectively, by weight. These solutions are each fed at a rate of 0.17 Kg/hr to the next purification stage. Each solution is filtered in two stages through ultrafilters (HC-5, supplied by Asahi Chem. Ind. Co., Ltd.) formed of hollow polyacrylonitrile fibers. Then the filtrate is fed into a column of 1 m packing height and 15 mm inner diameter, packed with 2 mm-diameter glass beads wherein the same purity nitrogen gas as used for removal of dissolved oxygen from the monomer mixture is flowed countercurrently at a rate of 80N 1/hr to expel oxygen. The thus purified polymerization initiator and chain transfer agent solutions are associated with the monomer flow immediately before entering the polymerization vessel, and the mixture is fed thereinto continuously.

The polymerization vessel is divided into a portion for complete mixing and a portion for plug flow, said portions having internal capacities of 9.5 and 1.7 Kg, respectively. The polymerization is conducted at temperatures of 135° to 140° C. in the complete mixing portion and at temperatures gradient from 140° to 170° C. in the plug flow portion. The polymer content in the product mixture is 42 wt %.

This crude product mixture is then continuously fed into a degasifier to expel volatile matter, yielding a core polymer. The weight-average molecular weight of this polymer is 98,000 as measured by GPC. The GPC is conducted by using a gel permeation chromatograph (LC-1, supplied by Shimazu Co., Ltd.) provided with columns HSG-20 and HSG-50, which was calibrated by using standard polystyrenes as molecular weight standards. Tetrahydrofuran is used for the solvent.

The clad polymer is formed of a transparent polymer constituted of 40 wt % of 2-(perfluorooctyl)ethyl methacrylate, 30 wt % of tetrafluoropropyl methacrylate, 20 wt % of trifluoroethyl methacrylate, and 10 wt % of methyl methacrylate. This copolymer is found to have a Vicat softening temperature (ASTM D-1525-76) of 70° C., refractive index $n^D_{20}$ of 1.410, and melt flow index (ASTM D1328, 230° C., 3.8 Kg load) of 35 g/10 min.

The core and clad polymers are fed into a composite spinning die to spin a fiber of core-cladding structure, which was then stretched and heat-treated to yield a plastic optical fiber of 0.98 core diameter and 1.00 outer diameter.

To measure light attenuations through this optical fiber, it is conditioned by drying in a hot-air oven at 70° C. for 5 hr. Then, this fiber is cut to a length of 52 m to prepare a test specimen.

The determination of the attenuations is carried out by using a fiber loss spectrometer model FP-889 mfd. by Oplex Corp. The lamp used for this determination is a quartz halogen lamp JC12V50W. The half breadth of spectrum diffracted by diffraction grating is 2.5 nm. A monochromatic light beam from a diffraction grating type of light source is converged to give an incident angle range of 0.15 radian and incident on an end surface of the sample fiber, said light source being previously calibrated for wavelengths by using standard light sources emitting severally rays of wavelengths 404, 546, and 632.8 nm. The light transmitted by the test specimen 52 m long is detected with an Si-Pin photodiode and outputs ($P_1$) therefrom are read in the wavelength range of 400 to 660 nm. Then the specimen is cut at a position 2 m distant from the light-incident end and removed except this 2-m long portion with this end left being fixed as such. The other end of the 2-m long fiber is properly fixed and then the intensity of the light transmitted by this short specimen was similarly measured, where the outputs ($P_2$) are read in the wavelength range of 400 to 660 nm. Attenuations through the plastic optical fiber is determined from the equation $dB/Km = 10 \times \log (P_2/P_1) \times (1000/(52-2))$. The found attenuations were 197, 103, 66, and 124 dB/Km at wavelengths of 400, 450, 570, and 650 nm, respectively. The spectrum of the determined attenuations is shown in FIG. 1.

Each attenuation is an average of many found values, in which variation is very small. The attenuation measurement was continued over 60 days.

During those periods, as one of the favorable date, there are observed the attenuations of 183, 98, 62 and 119 dB/Km at wavelengths of 400, 450, 570 and 650 nm, respectively.

EXAMPLE 2

The procedure of Example 1 is followed except that the amount of the chain transfer is altered, that is, a solution of 2.38 wt % of n-butyl mercaptan in ethylbenzene is fed at a rate of 0.17 Kg/hr to the polymerization vessel. The core polymer degasified through the vent-type extruder is found to have a weight-average molecular weight of 120,000. A core fiber formed from this polymer is coated with the same cladding polymer as used in Example 1. Light attenuations through the thus obtained plastic optical fiber are 240, 120, 70, and 128 dB/Km at wavelengths of 400, 450, 570, and 650 nm, respectively.

EXAMPLE 3

A monomer change test was conducted in the course of the polymerization of Example 1. That is, a monomer mixture of 99 wt % of methyl methacrylate and 1.0 wt % of ethyl acrylate, for exchange, is fed into the still. Thereafter, the procedure of Example 1 was followed and light attenuations through the obtained plastic optical fiber are measured.

The found value at 650 nm was 170 dB/Km after 1 day from the change of monomer, 150 dB/Km after 2 days, 135 dB/Km after 4 days, and 126 dB/Km after 6 days, nearly the same transmission efficiency as that of the fiber of Example 1 is attained, that is, the found attenuations found are 202, 105, 65, and 126 dB/Km at wavelengths of 400, 450, 570, and 650 nm, respectively.

COMPARATIVE EXAMPLE 1

Nitrogen gas is bubbled in methyl methacrylate contained in a feed tank, from which methyl methacrylate is fed into a still operating under a reduced pressure of 100 torr. After 50 hr from the start of the operation, a polymer of weight-average molecular weight at least 1,000,000 is detected in the distillate monomer and the condenser is soon blocked.

COMPARATIVE EXAMPLE 2

Methyl methacrylate, to which 0.144 wt % of n-butyl mercaptan is added, was fed into a still operating at a reduced pressure of 100 torr. After 5 hr from the start of the operation, a polymer is detected in the distillate and the condenser was blocked after 20 hr.

COMPARATIVE EXAMPLE 3

100 parts of methyl methacrylate containing no polymerization inhibitor is mixed with 0.144 part of n-butyl mercaptan and 0.004 part of azobisoctane in a make-up tank and nitrogen gas is bubbled in the mixture. The prepared mixture is filtered through an ultrafilter HC-5 formed of hollow polyacrylonitrile fibers. After 3 hr, pressure loss across the filter rose rapidly and the operation became impossible. The ultrafilter is found to be clogged with a polymer.

COMPARATIVE EXAMPLE 4

Methyl methacrylate containing no polymerization inhibitor is cooled to 0° C., subjected to nitrogen bubbling, and filtered through an ultrafilter HC-5 formed of hollow polyacrylonitrile fiber. After 10 hr from the start of the filtration, the pressure began increasing due to polymer formation and after 20 hr, the filtration became impossible.

COMPARATIVE EXAMPLE 5

The procedure of Example 1 is followed except for using a solvent ethylbenzene distilled only without alumina treatment.

Light attenuations through the obtained plastic optical fiber are 360, 160, 82, and 130 dB/Km at wavelengths of 400, 450, 570, and 650 nm, respectively.

COMPARATIVE EXAMPLE 6

Into a make-up tank are fed methyl methacrylate containing no polymerization inhibitor at a rate of 3.0 Kg/hr, a solution of 0.072 wt % of azobiscotane in alumina-treated and distilled ethylbenzene at a rate of 0.17 Kg/hr, and a solution of 2.935 wt % of n-butyl mercaptan in similarly purified ethylbenzene at a rate of 0.17 Kg/hr. Nitrogen gas is bubbled at a rate 1N $m^3$/hr in the mixture. This mixture, filtered continuously through a filter of 0.2 μm pore size, is fed into a polymerization vessel, where clogging of the filter does not take place. However, light attenuations through the plastic optical fiber formed from a polymer produced after 5 days from the start of operation are as large as 400, 205, 95, and 145 dB/Km at wavelengths of 400, 450, 570, and 650 nm, respectively.

COMPARATIVE EXAMPLE 7

During operation of the plastic optical fiber production process of Example 1, the cladding polymer is changed to a copolymer constituted of 80 wt % of 2-(perfluorooctyl)ethyl methacrylate and 20 wt % of methyl methacrylate, the melt flow index of which is 40 g/10 min. Strands formed by extruding this polymer is slightly turbid.

The obtained plastic optical fiber showed light attenuations of 340, 160, 91, and 151 dB/Km at wavelengths of 400, 450, 570, and 650 nm, respectively. Then this cladding polymer was changed again to the original one, thereupon retrieving the attenuation values of Example 1.

EXAMPLE 4

A plastic optical fiber obtained in Example 1 is coated with a polyethylene NUC 9109 to fabricate a plastic optical fiber cord of 2.2 mm outer diameter. This cord showed light attenuations of 196, 99, 63, and 121 dB/Km at wavelengths of 400, 450, 570, and 650 nm, respectively, which are little different from those shown by the bared fiber.

EXAMPLE 5

The same procedure of Example 1 is repeated to obtain a plastic optical fibre coated with a clad polymer except that the clad polymer is replaced by the one obtained by copolymerizing 76 parts by weight of 2-(perfluorooctyl)ethyl methacrylate, 18 parts by weight of difluoroethyl methacrylate and 6 parts by weight of methyl methacrylate, having a refractive index $n_D^{20}$ of 1.394, Vicat softening point of 64° C. and melt flow index (ASTM D1328, 230° C., 3.8 kg load) of 20 g/10 min.

The attenuations of thus obtained optical fibre are determined in the same manner as in Example 1 and the found attenuations are 200, 101, 63 and 118 dB/Km at wavelengths of 400, 450, 570, and 650 nm, respectively.

What is claimed is:

1. A plastic optical fiber comprising a core polymer constituted mainly of methyl methacrylate and a cladding polymer having a lower refractive index than that of the core polymer, said core polymer consists of a methyl methacrylate homopolymer or a copolymer constituted of at least 95% by weight of methyl methacrylate and less than 5% by weight of methyl acrylate, ethyl acrylate or a mixture thereof and having a weight-average molecular weight of from 80,000 to 200,000, said cladding polymer comprises (a) 40 to 80% by weight of 2-(perfluorooctyl)ethyl methacrylate represented by the formula $$CH_2{=}C(CH_3){-}COOCH_2CH_2(CF_2)_7CF_3,$$

(b) 15 to 50% by weight of at least one monomer selected from short-chain fluoroalkyl methacrylates represented by the formula $$CH_2{=}C(CH_3){-}COOCH_2(CF_2)_nX,$$

wherein X is H or F and n is an integer of 1 to 4, and (c) 0 to 10% by weight of methyl methacrylate, and exhibits a melt flow index of 10 to 200 g/10 min. at 230° C., refractive index $n_D^{20}$ of 1.39 to 1.42, and Vicat softening temperature of 50° to 85° C., and that light attenuations through the fiber are up to 250, 130, 80, and 130 dB/Km at wavelengths of 400, 450, 570, and 650 nm, respectively.

2. The plastic optical fiber of claim 1, wherein the short-chain fluoroalkyl methacrylates of (b) comprises at least 5% by weight of difluoroethyl methacrylate, tetrafluoropropyl methacrylate or a mixture thereof.

3. The plastic optical fiber of claim 1, wherein the weight-average molecular weight is from 90,000 to 120,000.

* * * * *